United States Patent
Weindorf et al.

(10) Patent No.: US 10,328,369 B2
(45) Date of Patent: *Jun. 25, 2019

(54) FILTER ELEMENT AND FILTER SYSTEM FOR A LIQUID MEDIUM WITH VENTILATION ON THE POST-FILTRATION SIDE AND ON THE PRE-FILTRATION SIDE

(71) Applicant: MANN+HUMMEL GMBH, Ludwigsburg (DE)

(72) Inventors: Martin Weindorf, Kornwestheim (DE); Idriss Razgani, Ludwigsburg (DE); Pius Trautmann, Stuttgart (DE); Bernd Nageldinger, Asperg (DE)

(73) Assignee: MANN+ HUMMEL GmbH, Ludwigsburg (DE)

( * ) Notice: Subject to any disclaimer, the term of this patent is extended or adjusted under 35 U.S.C. 154(b) by 60 days.

This patent is subject to a terminal disclaimer.

(21) Appl. No.: 15/409,199

(22) Filed: Jan. 18, 2017

(65) Prior Publication Data
US 2017/0203242 A1    Jul. 20, 2017

(30) Foreign Application Priority Data

Jan. 18, 2016  (DE) .................. 10 2016 000 339

(51) Int. Cl.
| | |
|---|---|
| *B01D 27/00* | (2006.01) |
| *B01D 35/00* | (2006.01) |
| *B01D 35/28* | (2006.01) |
| *B01D 36/00* | (2006.01) |
| *B01D 29/11* | (2006.01) |
| *B01D 35/30* | (2006.01) |
| *B01D 29/21* | (2006.01) |

(52) U.S. Cl.
CPC ............ *B01D 36/001* (2013.01); *B01D 29/11* (2013.01); *B01D 29/21* (2013.01); *B01D 35/005* (2013.01); *B01D 35/30* (2013.01); *B01D 36/003* (2013.01); *B01D 2201/295* (2013.01); *B01D 2201/347* (2013.01); *B01D 2201/4046* (2013.01)

(58) Field of Classification Search
USPC ................................................ 210/115, 436
See application file for complete search history.

(56) References Cited

U.S. PATENT DOCUMENTS 7,299,931 B2    11/2007  Schachtrup

FOREIGN PATENT DOCUMENTS

| DE | 102013020539 A1 | 6/2015 |
|---|---|---|
| DE | 102013226810 A1 | 6/2015 |

OTHER PUBLICATIONS

DE102012012542 Kusebauch et al.—Fuel Filtter Used in Motor Car (MT & Abstract; Jan. 2, 2014; 18 pages). (Year: 2014).*

* cited by examiner

*Primary Examiner* — Hayden Brewster
(74) *Attorney, Agent, or Firm* — James Hasselbeck

(57) ABSTRACT

A filter element (10) for a liquid medium, in particular fuel, having a first vent channel (60) connected at the intake end to the pre-filtration side (26) of the filter element (10), a second vent channel (66) connected at the intake end to the post-filtration side (28) of the filter element (10); and a vent tube (32) having has at one end an inlet opening (34) and at the other end an outlet opening for fluidic connection of the vent tube (32) to a vent stub of a filter housing, or a vent tube portion for connection to a vent tube of a filter housing.

14 Claims, 6 Drawing Sheets

FILTER ELEMENT AND FILTER SYSTEM FOR A LIQUID MEDIUM WITH VENTILATION ON THE POST-FILTRATION SIDE AND ON THE PRE-FILTRATION SIDE

TECHNICAL FIELD

The invention relates to a filter element for a liquid medium, in particular fuel, having a filter medium which is arranged in an annular manner relative to the longitudinal axis of the filter element, also having an end plate, which is the upper end plate when the filter element is in operation, and a lower end plate, between which the filter medium is retained, wherein a pre-filtration side arranged fluidically upstream of the filter medium in the flow direction of the liquid medium and a post-filtration side of the filter element arranged fluidically downstream of the filter medium are demarcated from one another by the filter medium. The filter element has a venting arrangement comprising a vent tube which extends axially away from the upper end plate in the direction of the lower end plate and which has an inlet opening at one end and an outlet opening at the other end for connecting the vent tube to a vent stub of a filter housing. A first vent channel of the venting arrangement is fluidically connected at the intake end to the pre-filtration side of the filter element and at the discharge end to the inlet opening of the vent tube.

BACKGROUND

A filter element of the aforementioned type is known for example from DE 10 2012 012 542 A1. In this filter element, during filter operation air can collect on the post-filtration side, so that a pressure buildup of the filtered liquid medium on the post-filtration side is difficult or delayed. This is disadvantageous in particular in the filtration of fuel in motor vehicles having an internal combustion engine and a so-called automatic start-stop operation.

SUMMARY

The object of the invention is to provide a filter element and a filter system having such a filter element, wherein during operation a fast pressure buildup of the liquid medium on the post-filtration side is made possible.

In filter operation the filter element according to the invention enables venting both on the pre-filtration side and also on the post-filtration side, so that a compressible volume of air arranged on the pre-filtration side and on the post-filtration side can be discharged quickly from the filter element via the vent tube. Overall as a result a quicker pressure buildup of the liquid medium can be achieved. Because of the venting on the post-filtration side the filtered liquid medium can therefore be made available without delay after commencement of the filter operation with a sufficient pressure or with a sufficient volumetric flow for the particular purpose for which it is to be used. This is advantageous in particular when the filter element is used as a fuel filter in motor vehicles having an internal combustion engine and in a so-called start-stop automatic operation.

The vent tube is preferably made in one piece and fastened to the element. Alternatively the vent tube can be made in multiple parts, wherein the components are distributed over the filter element and the housing which accommodates the filter element. In this case the filter element has a vent tube portion which can be connected in particular in a fluid-tight manner to the vent tube on the filter housing.

The following statements with respect to the vent tube apply in the same way to both variants. The end portion of the vent tube fastened to the element that is associated with the inlet opening is equivalent to the vent tube portion on the filter element with the vent tube fastened to the housing.

According to a particularly preferred further embodiment of the invention the vent tube on the inlet opening side is held in a recess in the upper end plate. In this case the recess in the upper end plate can be delimited in the radial direction externally by an elongated outer wall member and in the radial direction internally by an elongated inner wall member of the upper end plate, wherein the two wall members of the upper end plate are formed in one piece with one another. In this way the vent tube can be positioned in a cost-effective and reliable manner in a predetermined position relative to the two vent channels. According to the invention the vent tube arranged in the recess of the upper end plate can be held in particular in a radial press fit. In this way, on the one hand, the installation of the filter element is further simplified, particularly since the vent tube only has to be inserted into the recess.

The vent tube is particularly preferably fastened to the filter element. In other words, the vent tube is preferably formed as an integral component of the filter element and is installed or replaced as a structural unit with this element.

According to the invention the first vent channel can be delimited in the radial direction at least partially by the inner wall member of the upper end plate and also by an insert part of the upper end plate. In this way the first vent channel can be realized in a particularly simple and cost-effective manner.

According to the invention the first vent channel can comprise, in particular, a groove, which is open in the radial direction, in the inner wall member or the insert part of the upper end plate. As a result the first vent channel can be produced in a simple and cost-effective manner by an injection molding process used for production of the end plate or of the insert part with a suitable (small) flow cross-section suitable for ventilation purposes. The first vent channel is preferably configured at least in part as a so-called capillary channel, in order to ensure a capillarity with respect to the liquid medium, i.e. a capillary effect. In this way it is possible to counteract both an undesirable backflow of air via the first vent channel and also an undesirable pressure loss on the pre-filtration side or an excessive volumetric flow of the liquid medium via the first vent channel.

According to the invention the insert part can extend through an opening in the upper end plate in the axial direction into the filter element, said opening being delimited in the radially direction by the inner wall member of the upper end plate. According to an alternative embodiment of the invention the insert part is configured as an H-profiled double sleeve which extends in the axial direction into the recess in the upper end plate.

An H-profiled double sleeve is understood to be such a double sleeve which is H-shaped in longitudinal section.

According to a preferred further embodiment of the invention the upper end plate or the insert part arranged in the opening in the upper end plate can be provided with a throttle bore through which the pre-filtration side of the filter element is fluidically connected to the first vent channel. Such a throttle bore, on the one hand, enables a passage of air and, on the other hand, makes excessive passage of the liquid medium difficult.

In the radial direction the second vent channel of the filter element can be delimited at least in part by the outer wall member of the upper end plate and the vent tube. According to the invention the second vent channel can comprise a groove, which is open in the radial direction, in the outer wall member of the upper end plate or of the vent tube. This offers advantages in terms of manufacturing technology.

When the filter element is in operation an undesirable passage of the liquid medium through the first/second vent channel must be counteracted. According to the invention the groove in the first and/or the second vent channel can be configured as a spiral groove which runs helically around the longitudinal axis of the filter element. As a result a required flow resistance of the first or of the second vent channel can be set simply for the liquid medium. The spiral formation of the first and/or second vent channel is associated with a greater length of the respective vent channel. As a result, with a flow resistance which is unchanged relative to the vent channel, the respective vent channel can be formed with a larger cross-section which is advantageous in terms of manufacturing technology.

According to the invention the venting arrangement preferably has a siphon into which the first and/or the second vent channel opens/open. In the event of an interruption of the filter operation of the filter element, as is the case for example when an internal combustion engine of a motor vehicle operated by the liquid medium is switched off, an undesirable retrograde ingress of air from the vent tube via the first vent channel to the post-filtration side or via the second vent channel to the pre-filtration side of the filter element can be counteracted by the siphon. Furthermore, if the first and also the second vent channel open into the siphon, an undesirable ingress of air from the pre-filtration side to the post-filtration side of the filter element through which the liquid medium flows can be counteracted.

According to the invention the siphon can be delimited in the radial direction internally by an end portion of the vent tube and in the radial direction externally by a tube stub which is formed on the vent tube and engages in the recess in the upper end plate. In this case the vent tube has a dual function. On the one hand, it enables the venting the post-filtration side and the pre-filtration side of the filter element and, on the other hand, it serves as a component for radially delimiting the siphon. The reduction in necessary components achieved in this way offers cost advantages overall in the manufacture of the filter element.

In the structurally simplest case the siphon is delimited in the axial direction (downwards, i.e. in the direction of the lower end plate of the filter element) by a holding portion, by means of which the tube stub of the vent tube is formed on the vent tube.

The siphon can be fluidically connected to the inlet opening of the vent tube, in particular, by means of an axially extending riser channel which is formed between the vent tube and an insert part of the upper end plate.

In the case of the insert part arranged in the opening in the upper end plate, this part extends, preferably together with the inner wall member of the upper end plate, in the axial direction into the siphon. In other words, the insert part and the inner wall member, in part, are arranged in the radial direction between the end portion of the vent tube and the tube stub of the vent tube. In the case of the aforementioned double sleeve, which is profiled in an H shape in longitudinal section, the double sleeve extends into the siphon, i.e. the double sleeve is arranged in part in the radial direction between the end portion of the vent tube and the tube stub of the vent tube.

The filter medium can be glued in a manner known per se to the two end plates or can be embedded in the material of the two end plates.

The filter system according to the invention has a filter element according to the invention and a filter housing to accommodate the filter element. In one embodiment the filter element has a vent tube which extends as far as a stub on the filter housing and can be connected thereto in a fluid-tight manner. In an alternative embodiment the filter housing has a vent tube, which extends in the axial direction into an accommodating space for the filter element and can be connected to a vent tube portion of the filter element in a fluid-tight manner. For example, on the filter element the vent tube portion surrounds the vent tube which is fixed to the housing. For sealing, the vent tube fixed to the housing has a sealing element which is arranged on an outer circumference in order to produce a radial seal.

BRIEF DESCRIPTION OF THE DRAWINGS

The invention is described in greater detail below with reference to two embodiments illustrated in the drawings. In the drawings.

DETAILED DESCRIPTION

Figure 1:
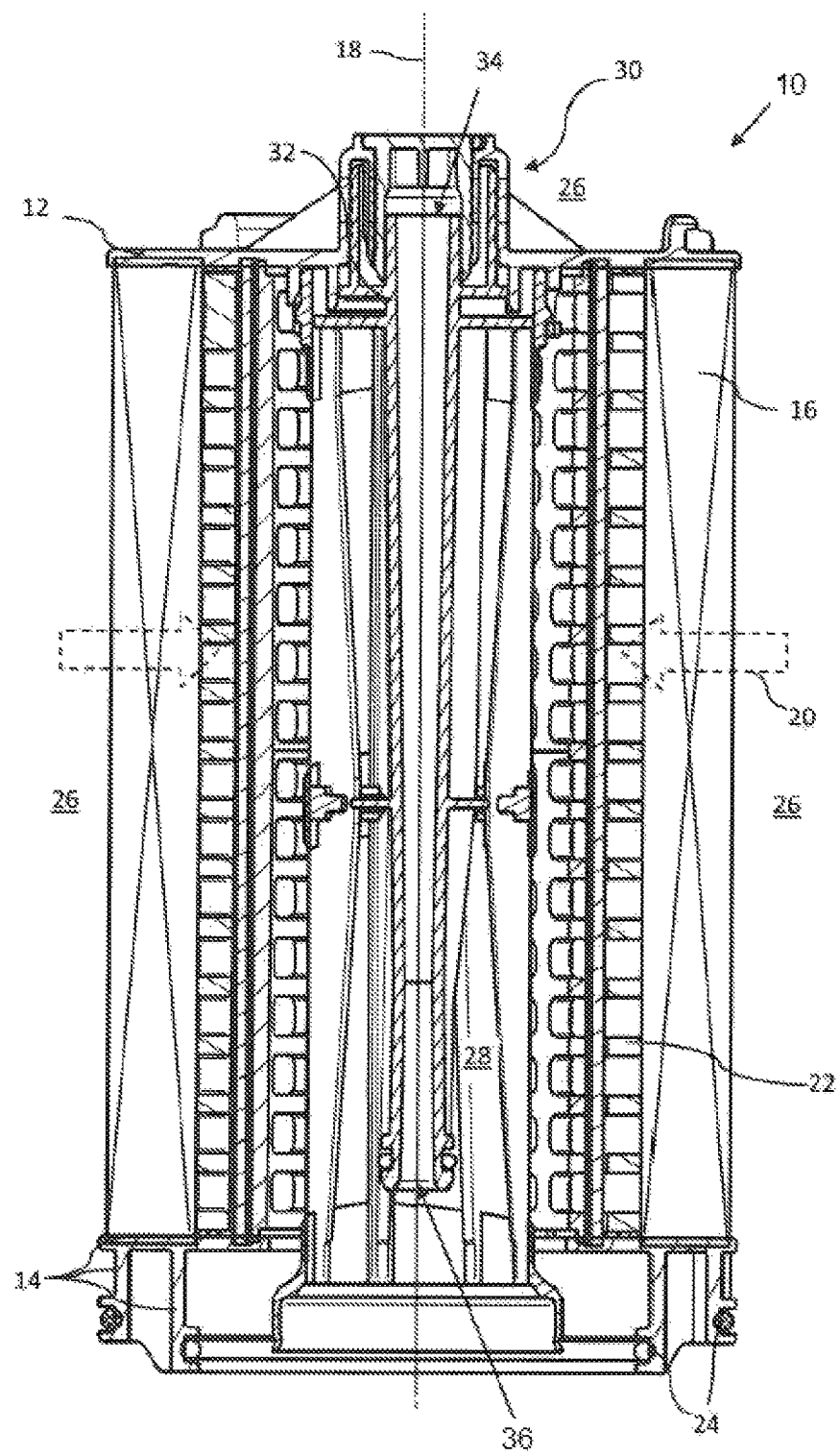
FIG. 1 shows, in longitudinal section, a filter element comprising an upper and a lower end plate, between which a filter medium is arranged, and two vent channels for a post-filtration side and a pre-filtration side of the filter element which are configured spirally and are connected by means of a common siphon to a vent tube which is fixed to the element and arranged centrally.

FIG. 1 shows a filter element 10 for filtering out contaminants contained in a liquid medium, in particular fuel. The filter element 10 is provided as a replaceable wear part for use in a filter housing of a liquid filter which is not illustrated in greater detail. In its operating position the filter element 10 has an upper and a lower end plate 12, 14, between which a filter medium 16 is arranged for filtering out particulate contaminants contained in the fuel. The filter medium 16 is arranged in an annular manner relative to the central or longitudinal axis 18 of the filter element and can be configured in particular in the form of a bellows pleated in a star shape. The filter medium 16 is glued at both ends to the end plates 12, 14 or is retained embedded in a fluid-tight manner in the material of the end plates 12, 14. In operation, i.e. in filter operation, the liquid medium can flow from radially outside to radially inside through the filter medium in a flow direction 20 extending radially with respect to the longitudinal axis 18. A supporting or central tube 22 which is configured in the form of a grid, and against which the filter medium 16 bears directly or indirectly on the inside, serves for radially internal support of the filter medium 16. The lower end plate 14 has sealing elements 24, preferably elastomeric, as a sealing seat of the filter element 10 in a filter housing.

A flow region of the contaminated fuel to be filtered is arranged fluidically upstream of the filter medium 16 and forms a so-called pre-filtration side 26 of the filter element. A post-filtration side of the filter element 10 arranged fluidically downstream of the filter medium is designated by 28.

The filter element has a venting arrangement 30, which facilitates venting of the pre-filtration side 26 and also the post-filtration side 28 of the filter element 10. The venting arrangement 30 comprises a vent tube 32 fastened to the element. The vent tube 32 is therefore an integral component of the filter element 10 and, as such, forms an assembly together with this element. The vent tube 32 is arranged so that it extends coaxially with respect to the longitudinal axis 18 of the filter element 10 and is arranged partially inside the filter medium. According to FIG. 1 the vent tube 32 extends substantially from the upper end plate 12 axially in the direction of the lower end plate 14, but it can also protrude or project in the axial direction beyond the lower end plate 14. The vent tube 32 has an upper inlet opening 34 and a lower outlet opening 36, for connecting the vent tube 32 to a vent stub (not shown) of the aforementioned filter housing, which vent stub can be fluidically connected, for example, to a fuel tank of a motor vehicle. For this purpose the vent tube 32 can be provided with a sealing element 24.

Figure 2:
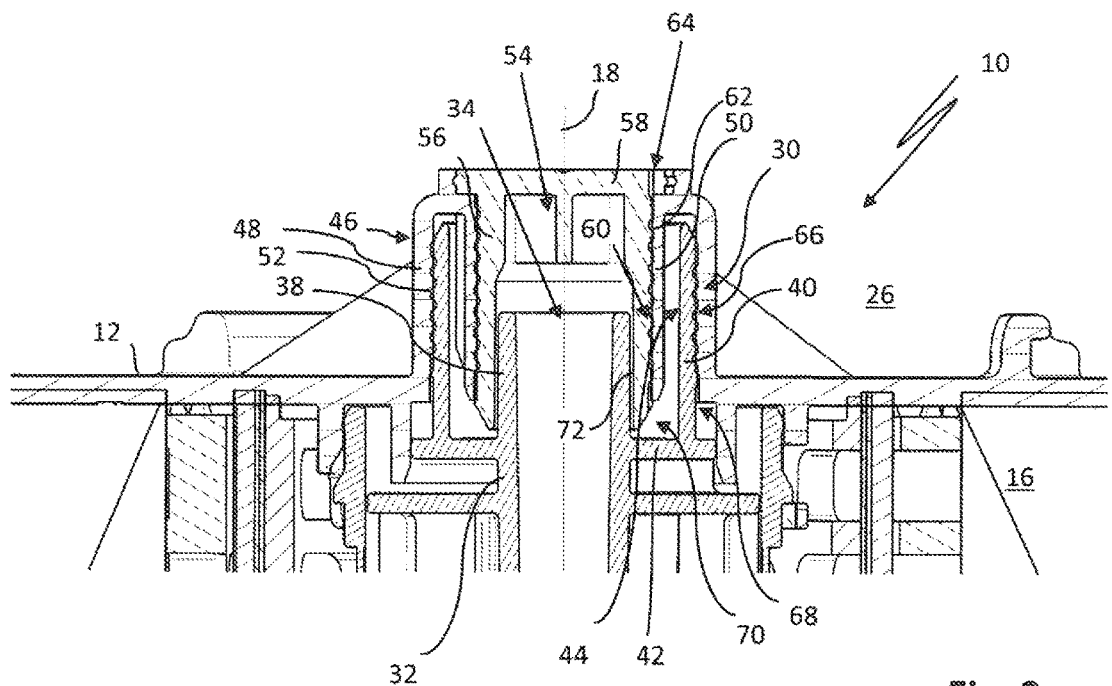
FIG. 2 shows a detail of the filter element of FIG. 1.
Figure 3:
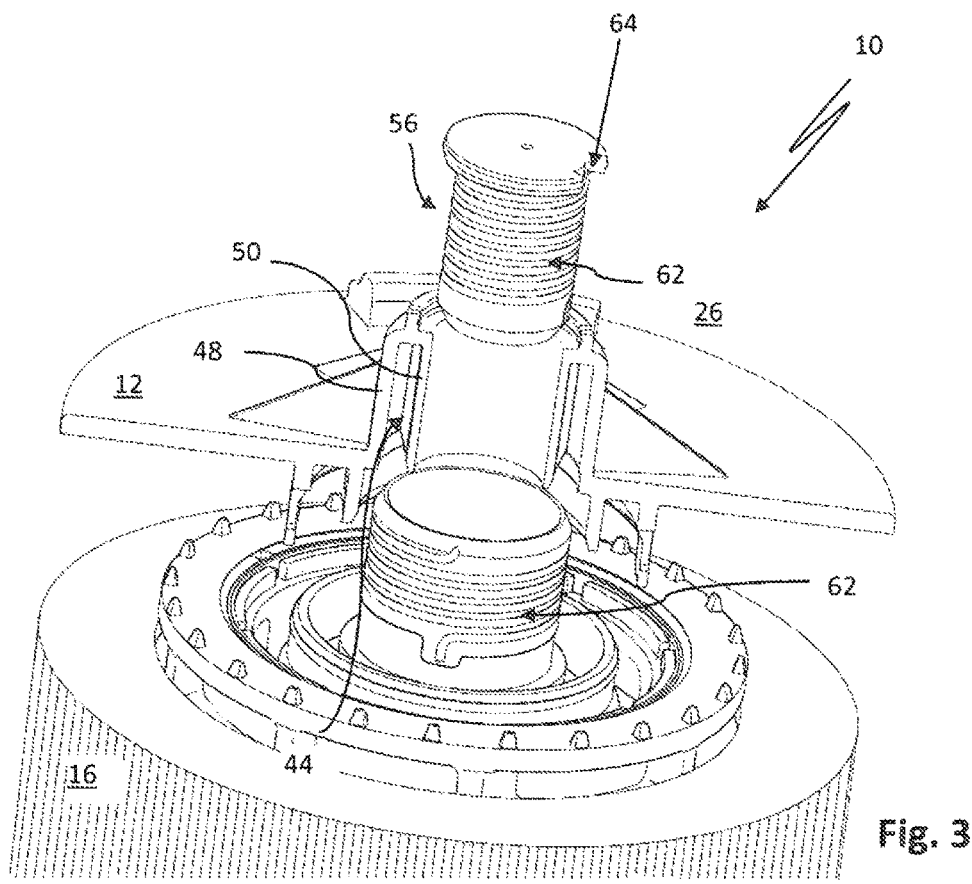
FIG. 3 shows a detail of the filter element of FIG. 1 in a partially exploded and sectional representation of the parts thereof.
Figure 4:
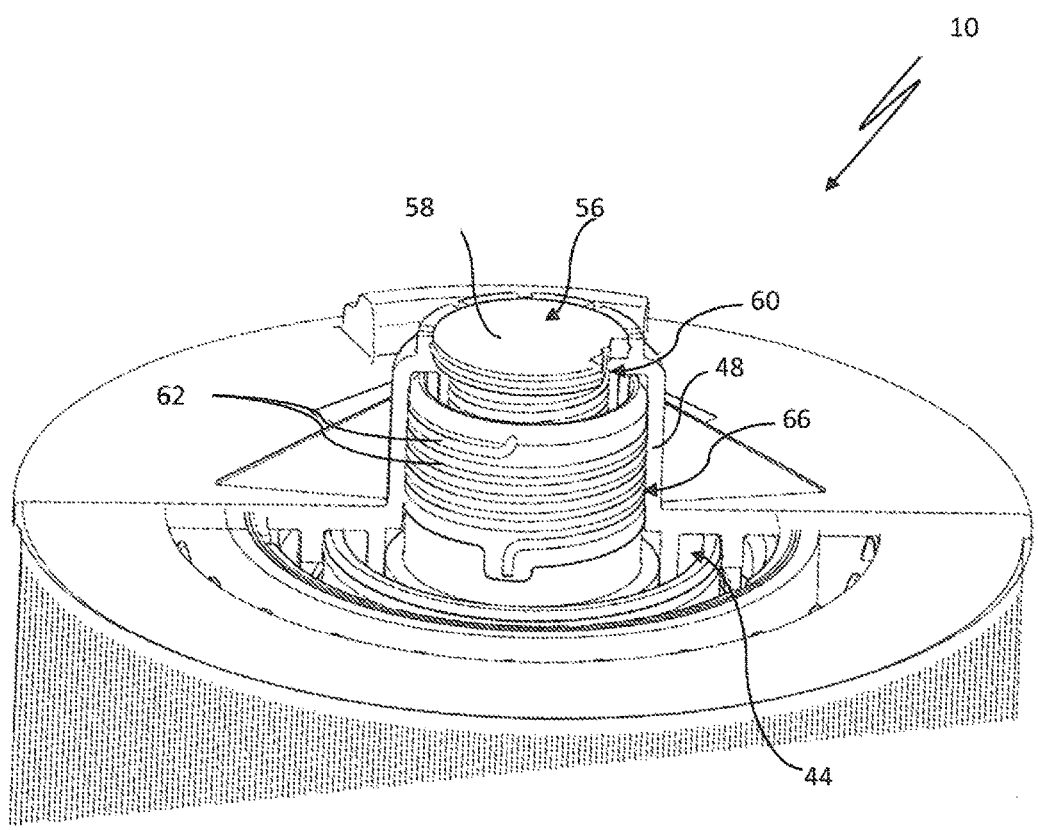
FIG. 4 shows a detail of the filter element of FIG. 1 in a partially sectional representation.

FIGS. 2 to 4 each show an enlarged detail of the filter element according to FIG. 1. The vent tube 32 has an upper end portion 38, on which a cylindrical tube stub 40 is formed by means of a connecting portion 42. The tube stub 40 surrounds the end portion 38 of the vent tube 32 and extends into a recess 44 of a double-walled stub 46 of the upper end plate 12. The stub 46 extends in the axial direction away from the upper end plate 12. The depression 44 in the upper end plate 12 is delimited in the radial direction outwards by an annular outer wall member 48 of the stub 46 or of the upper end plate 12. Internally in the radial direction the recess 44 is delimited by an annular inner wall member 50 of the stub 46 or of the upper end plate 12. The outer and the inner wall members 48, 50 are made integrally with the upper end plate 12 and are connected to one another by means of a back portion designated by 52.

The tube stub 40 of the vent tube 32 bears with its outer shell surface 52 against the outer wall member 48 of the upper end plate 12 in a radial press fit internally and as a result is permanently held on the upper end plate 12.

The upper end plate has a central opening 54. The central opening 54 is delimited by the inner wall member 50 of the stub 46 of the upper end plate 12. An insert part 56 formed as a closure sleeve is held inside the central opening 54. The insert part 56 is closed at one end by a base portion 58. The insert part 56 is supported axially by its base portion 58 on the stub 46 of the upper end plate 12 and is kept latched circumferentially on the stub 46. It will be understood that the insert part can also be fastened in some other way on the upper end plate. The insert part 56 extends into the filter element 10 in the axial direction and bears against the inner wall member 50 of the upper end plate 12 in the radial direction on the inside by non-positive engagement, preferably in a radial press fit.

For venting the pre-filtration side 26 of the filter element 10, the venting arrangement 30 has a first capillary vent channel 60. The first vent channel 60 comprises a groove 62 arranged externally on the insert part. The groove 62 is formed as a spiral groove and is arranged so that it extends helically with respect to the longitudinal axis 18 of the filter element 10. The spiral groove is covered or delimited externally in the radial direction by the inner wall member 50 of the upper end plate 12. The first vent channel has an inlet 64 which is formed in the base portion 58 of the insert part 56.

A second capillary vent channel 66 of the venting arrangement 30 serves for venting the post-filtration side 28 of the filter element 10. The second vent channel 66 comprises a groove 62 which is arranged externally on the tube stub 40 of the vent tube 32 and which is delimited in the radial direction by the outer wall member 48 of the upper end plate 12. The groove 62 is formed as a spiral groove in a manner corresponding to the first vent channel. The groove 62 of the second vent channel 66 has an inlet designated by 68.

The venting arrangement has a siphon 70 comprising a riser channel 72 which, when the filter element 10 is in operation, is at least partially filled with the liquid medium. The siphon 70 is arranged fluidically between the two vent channels 60, 66 and the upper inlet opening 34 of the vent tube 32. The siphon 70 is delimited in the radial direction externally by the tube stub 40 and in the radial direction internally by the upper end portion 38 of the vent tube 32. The connecting portion 42 of the vent tube 32 serves for delimitation of the siphon 70 axially downwards. The two vent channels 60, 66 each open into the axially extending (annular) riser channel 72, which is connected to the upper inlet opening of the vent tube 32. Because the insert part extends into the siphon, this results in an overall meandering flow path for the to air to be drained through the siphon 70.

During the filter operation, the venting arrangement 30 enables permanent venting of the post-filtration side 28 of the filter element 10 and also of the pre-filtration side 26 of the filter element 10, and therefore of the filter housing (not shown). Even in the absence of a throughflow of the liquid medium through the filter element 10, for instance after the shutdown of an internal combustion engine operated by the fuel, the siphon 70, in particular the riser channel 72, and also optionally the capillary vent channels, remain filled with fluid. In this way an undesirable backflow of air from the vent tube 32 onto the post-filtration side 28 and also the pre-filtration side 26 of the filter element 10 can be reliably counteracted. Penetration of air from the pre-filtration side 26 of the filter element 10 onto the post-filtration side 28 thereof can also be counteracted by the siphon 70. Consequently, when the filter operation is resumed, i.e. when the internal combustion engine is started, a predetermined operating pressure of the liquid medium or of the fuel on the post-filtration side 28 of the filter element 10 can be built up quickly. This is advantageous in particular when the filter element 10 is used in vehicles which are used in inner-city or regional distribution transport and which have a so-called automatic start-stop.

In FIG. 3 the filter element 10 is illustrated as a detail in a partially exploded representation. The capillary grooves 62 of the tube stub 40 of the vent tube and also of the insert part can be clearly seen. The vent tube 32, the insert part 56 and also the upper end plate 12 of the filter element 10 can each be formed as injection moldings.

Figure 5:
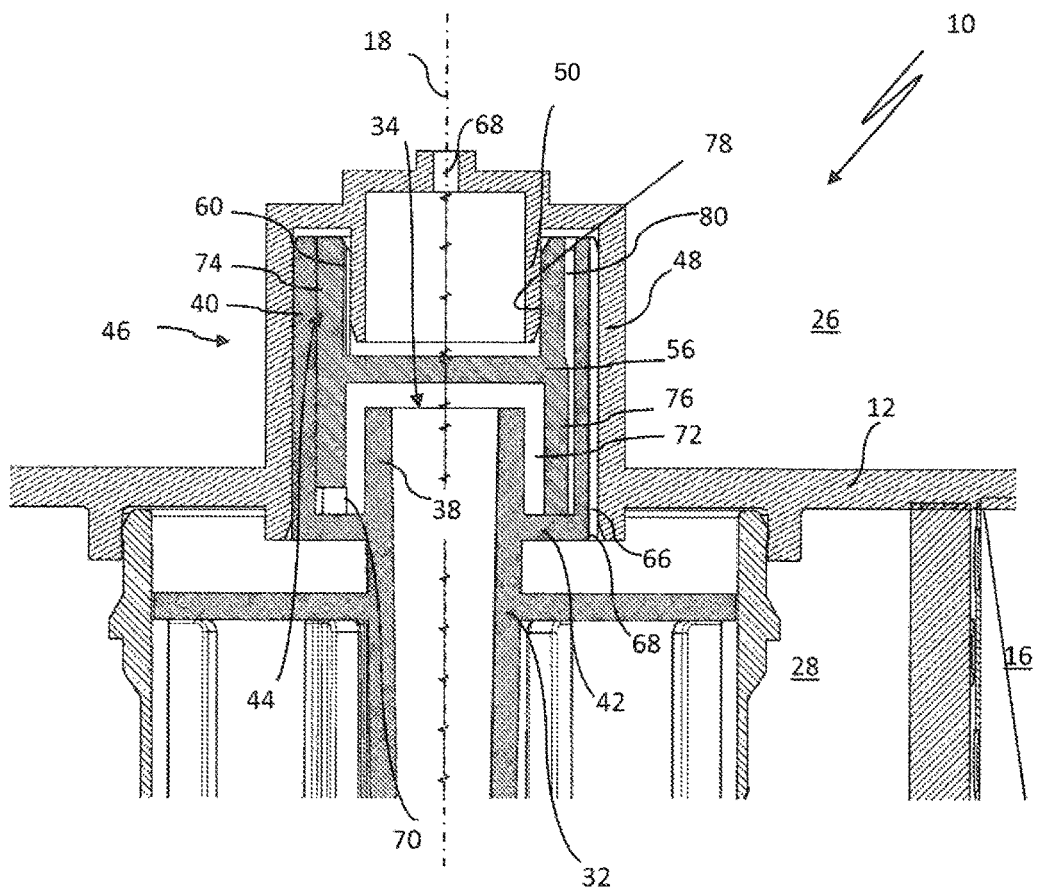
FIG. 5 shows a longitudinal sectional detail of a further filter element, wherein the vent channels are in each case configured as axial channels extending in a straight line.
Figure 6:
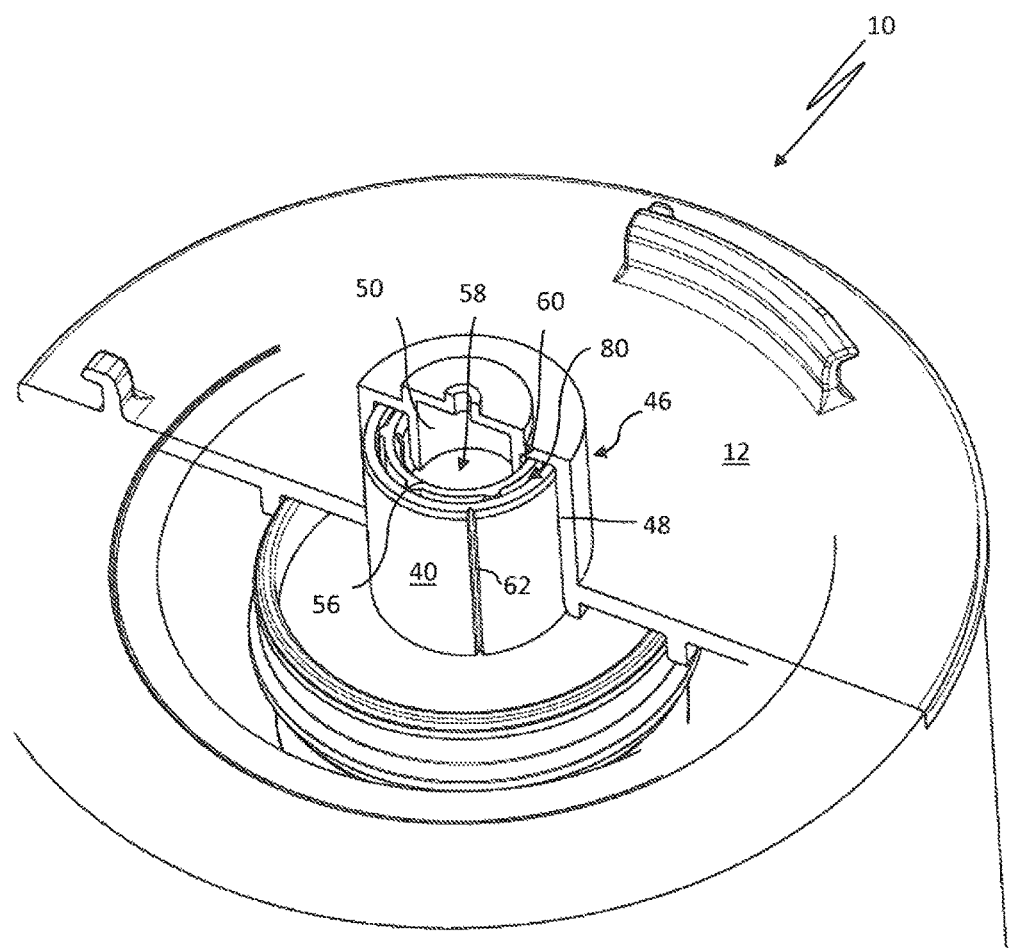
FIG. 6 shows the filter element of FIG. 4 in a partially exploded and sectional representation of the parts thereof.
Figure 7:
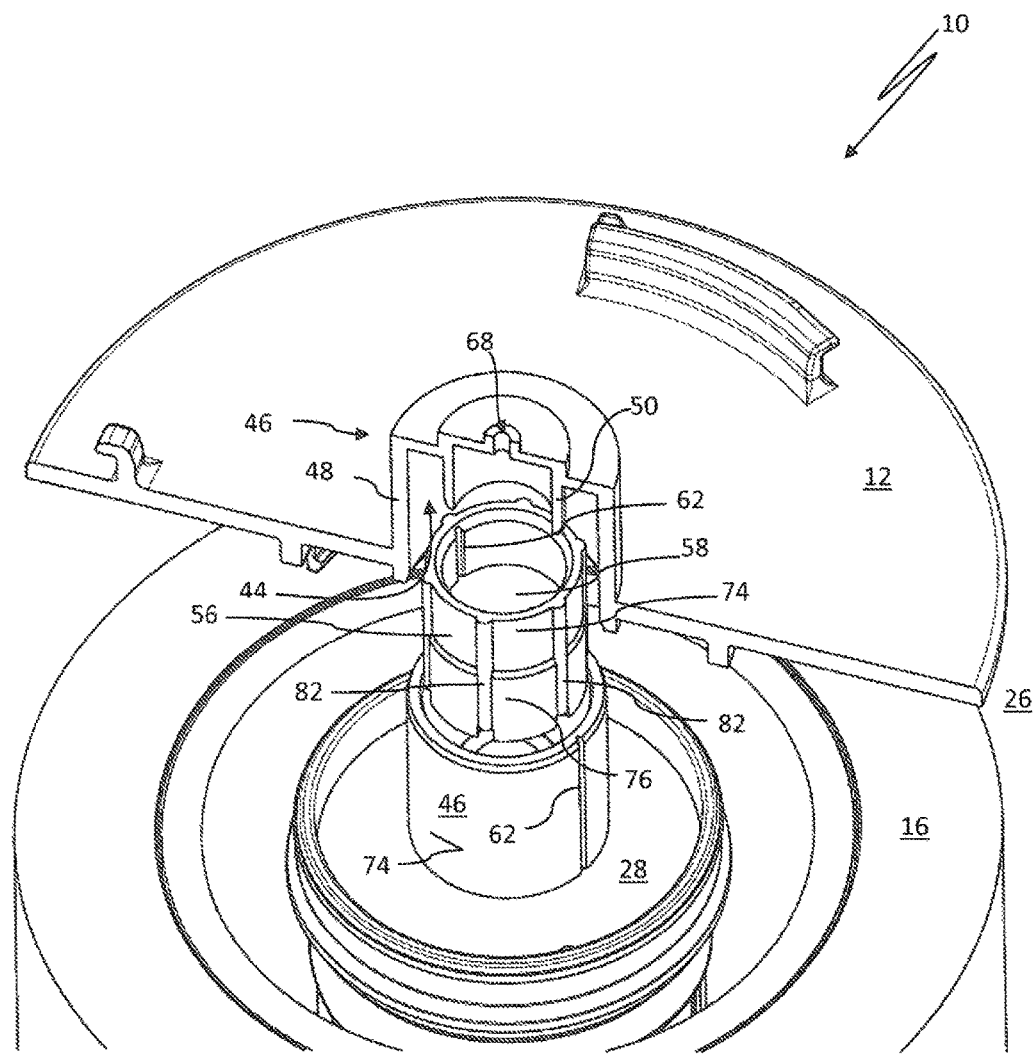
FIG. 7 shows the filter element of FIG. 4 in a partially sectional representation.

FIGS. 5 to 7 show a further filter element 10. The filter element 10 differs from the filter element explained above in connection with FIGS. 1 to 4 primarily in that the insert part 56 is formed as a double sleeve is formed with an H-shaped longitudinal sectional profile. The insert part has a base portion 58 comprising a first (upper) and a second (lower) sleeve portion 74, 76. The first sleeve portion 74 extends axially from the base portion 58 into the recess 44 in the upper end plate 12 and bears with its inner face 78 against the inner wall member 50 of the upper end plate 12 in positive engagement, and also preferably in a radial press fit. The first vent channel 60 comprises a linear and axially extending groove 62 which is arranged internally on the first sleeve portion 74 and is delimited in the radial direction by the first sleeve portion 74 of the insert part 56 and the inner wall member 50 thereof. The second sleeve portion 76 extends in the axial direction into the siphon 70. The second vent channel 66 is formed between the tube stub 40 of the vent tube 32 and the outer wall member 48 of the upper end plate 12.

The two vent channels 60, 66 open into a common and substantially annular collecting channel 80, which is formed in the radial direction between the tube stub 40 and the insert part 56. The collecting channel 80, with the riser channel 72 and the horizontally oriented region between them, forms the siphon 70. The riser channel 72 of the siphon 70 is fluidically connected to the upper inlet opening 34 of the vent tube 32. The first vent channel 60 is fluidically connected by means of an inlet 64 formed as a through bore in the upper end plate 12 to the pre-filtration side (=outer side) 26 of the filter element 10. The linear axial configuration of the two vent channels 60, 66 can be clearly seen in the partially sectional perspective view of a detail of the filter element 10 in FIG. 6 or the partially exploded view of the parts of the filter element in FIG. 7. In the circumferential direction of the filter element 10 the common collecting channel 80 of the two capillary vent channels 60, 66 is interrupted by rib-like spacers 82 of the insert part 56 which extend away from the insert part 56 in the radial direction. According to FIG. 7 the rib-like spacers 82 extend in the axial direction over the entire length of the insert part 56. Since fluid can likewise remain in the vent channel 60 and the interior space delimited by the inner wall member 50, a siphon (on the post-filtration side) is also formed at this point.

What is claimed is:
1. A filter element (10) for a liquid medium, comprising:
an annular filter medium (16) arranged on a longitudinal axis (18) of the filter element (10);
an upper end plate (12) arranged on an upper axial end of the annular filter medium (16), the upper end plate (12) having:
a double walled stub (46) circumferentially surrounding a central opening (54) of the upper end plate, the double walled stub (46) projecting axially outwardly from an exterior side of the upper end plate (12) of the filter element (10), the double walled stub (46) having:
an axially projecting annular outer wall member (48) encircling the central opening (54), having a first axial end formed on the upper end plate (12) and projecting axially outwardly from the exterior side of the upper end plate (12) to a second end;
an axially projecting annular inner wall member (50) spaced apart radially inwardly from the annular outer wall member (48), the annular inner wall member (50) connected to the second end of the annular outer wall member (48) and projecting axially inwardly therefrom;
an insert part (56) arranged against a radially inner side of the inner wall member (50);
wherein the filter element (10) has:

a pre-filtration side (26) arranged at radially outer side of the annular filter medium (16), the pre-filtration side (26) arranged fluidically upstream of the annular filter medium (16); and
a post-filtration side (28) arranged at radially interior side of the annular filter medium (16), the post-filtration side (28) arranged fluidically downstream of the filter medium (16);
a venting arrangement (30) arranged on the upper end plate (12) and venting both the pre-filtration side and the post-filtration side (26, 28) of the filter element (10) through the upper end plate (12), the venting arrangement (30) comprising:
a first axially elongated spiral groove (60) formed between the radially inner side of the annular inner wall member (50) and the insert part (56), forming a first axially elongated spiral venting channel having an intake end fluidically connected to the pre-filtration side (26) of the filter element (10);
a vent tube (32) connected to the upper end plate (12) and extending away from the upper end plate (12) axially in a direction of towards a lower end plate (14) of the filter element (10);
wherein the vent tube (32) has at a first end an inlet opening (34) and at the other end an outlet opening (36);
wherein the vent tube has formed thereon a cylindrical tube stub (40) radially surrounding the first end of the vent tube (32) and received into an annular recess of the double walled stub, between the annular outer wall member (48) and the annular inner wall member (48);
a second axially elongated spiral groove (62) formed between the axially projecting annular outer wall member (48) and the cylindrical tube stub (40), forming a second axially elongated spiral venting channel (66) having an intake end fluidically connected to the post-filtration side (28) of the filter element (10);
wherein the two axially elongated spiral venting channels (60,66) are in each case fluidically connected at a discharge end to the inlet opening (34) of the vent tube (32).
2. The filter element according to claim 1, wherein the vent tube (32) is retained on an inlet opening side in a recess (44) between the outer wall member (48) and the inner wall member (50) in the upper end plate (12), wherein the outer wall member (48), the inner wall member (50) and the upper end plate (12) are formed in one piece with one another.
3. The filter element according to claim 2, wherein the vent tube (32) is retained in the recess (44) in the upper end plate (12) in a radial press fit in which the outer wall member (50) is presses tightly against an outer side of the cylindrical tube stub (40).
4. The filter element according to claim 1, wherein the first vent channel (60) is delimited in the radial direction at least in part by the inner wall member (50) of the upper end plate (12) and also by an insert part (56) of the upper end plate (12).
5. The filter element according to claim 4, wherein the first vent channel (60) comprises a groove, which is open in the radial direction, in the inner wall member (50) or the insert part (56) of the upper end plate (12).
6. The filter element according to claim 4, wherein the insert part (56) extends through a central opening (54) in the upper end plate in the axial direction into the filter element (10), which opening is delimited in the radial direction by the inner wall member (50) of the upper end plate (12), or in that the insert part (56) is configured as an H-profiled double sleeve which extends in the axial direction into the recess (44) in the upper end plate (12).

7. The filter element according to claim 6, wherein the first vent channel (60) is fluidically connected to the pre-filtration side (26) of the filter element (10) via an inlet (68) arranged in the upper end plate (12) or in the insert part (56) of the upper end plate.

8. The filter element according to claim 1, wherein the second vent channel (66) of the filter element (10) is delimited at least in part in the radial direction by the outer wall member (48) of the upper end plate (12) and the vent tube (32).

9. The filter element according to claim 8, wherein the first vent channel (66) comprises a groove, which is open in the radial direction, in the outer wall member (48) of the upper end plate (12) or the vent tube (32).

10. The filter element according to claim 5, wherein the groove (62) is configured as a spiral groove which extends helically around the longitudinal axis (18) of the filter element (10).

11. The filter element according to claim 1, wherein the venting arrangement (30) has a siphon (70) into which the first and the second vent channels (60, 66) open; wherein the siphon (70) is delimited in the radial direction internally by an end portion (38) of the vent tube (32) and in the radial direction externally by the cylindrical tube stub (40) which is formed on the vent tube (32) and engages in the recess (44) in the upper end plate (12).

12. The filter element according to claim 11, wherein the siphon (70) is delimited in the axial direction by a connecting portion (42) formed on the vent tube (42), the connecting portion (42) is a radially extending wall connecting the cylindrical tube stub (40) to the vent tube (32).

13. A filter system comprising
a filter housing to accommodate a filter element and the filter element according to claim 1.

14. The filter system according to claim 13, wherein the filter housing has a vent tube which extends in the axial direction into an accommodating space for the filter element and can be connected to the vent tube of the filter element.

* * * * *